(12) United States Patent
Nishizaki

(10) Patent No.: US 7,493,985 B2
(45) Date of Patent: Feb. 24, 2009

(54) ELECTRIC MOTOR POWER STEERING SYSTEM

(75) Inventor: Katsutoshi Nishizaki, Nabari (JP)

(73) Assignee: JTEKT Corporation, Osaka (JP)

( * ) Notice: Subject to any disclaimer, the term of this patent is extended or adjusted under 35 U.S.C. 154(b) by 508 days.

(21) Appl. No.: 10/572,909

(22) PCT Filed: Sep. 24, 2004

(86) PCT No.: PCT/JP2004/013950

§ 371 (c)(1),
(2), (4) Date: Mar. 21, 2006

(87) PCT Pub. No.: WO2005/032912

PCT Pub. Date: Apr. 14, 2005

(65) Prior Publication Data

US 2007/0068725 A1    Mar. 29, 2007

(30) Foreign Application Priority Data

Oct. 1, 2003    (JP) .............................. 2003-343620

(51) Int. Cl.
*B62D 5/04* (2006.01)
*B62D 7/22* (2006.01)
(52) U.S. Cl. ....................... 180/444; 180/400
(58) Field of Classification Search ................ 180/400, 180/444; 280/124.108, 5.515; 74/492, 493
See application file for complete search history.

(56) References Cited

U.S. PATENT DOCUMENTS

| | | | | |
|---|---|---|---|---|
| 2,604,669 A | * | 7/1952 | Smith ........................ | 19/106 A |
| 2,898,538 A | * | 8/1959 | Rafferty ..................... | 318/651 |
| 3,277,840 A | * | 10/1966 | Li .............................. | 105/145 |
| 4,693,491 A | * | 9/1987 | Akatsu et al. ......... | 280/124.108 |
| 4,712,446 A | * | 12/1987 | Kamata et al. ................. | 74/492 |
| 5,100,166 A | * | 3/1992 | Mitsui ..................... | 280/5.515 |
| 6,041,885 A | * | 3/2000 | Watanabe et al. ........... | 180/444 |
| 6,219,603 B1 | * | 4/2001 | Yamamoto et al. ............ | 701/41 |
| 6,776,253 B2 | * | 8/2004 | Tomago et al. .............. | 180/444 |
| 7,360,468 B2 | * | 4/2008 | Yabe et al. .................... | 74/446 |
| 2003/0121713 A1 | * | 7/2003 | Stout et al. .................. | 180/400 |
| 2006/0119063 A1 | * | 6/2006 | Bodin .......................... | 280/89 |

(Continued)

FOREIGN PATENT DOCUMENTS

EP    1767436 A1 *    3/2007

(Continued)

*Primary Examiner*—Paul N Dickson
*Assistant Examiner*—Daniel Yeagley
(74) *Attorney, Agent, or Firm*—Birch, Stewart, Kolasch & Birch, LLP

(57) ABSTRACT

In an electric power steering system providing steering assist by applying a power of an electric motor to a steering mechanism via a reduction mechanism, the steering mechanism extending from a steering member to dirigible wheels, a grease (viscous material) is applied to a meshing engagement portion between teeth portions disposed on a motor-power transmission path extending from the electric motor to the steering mechanism via the reduction mechanism, the grease having a viscosity constant C satisfying $0.8 \ J\omega p \leq C$ where J denotes the inertia of the electric motor, and ωp denotes the resonant angular frequency of the steering mechanism including the electric motor and the reduction mechanism. This provides for the prevention of the occurrence of rattling noises caused by a vibration system including the reduction mechanism and the electric motor and the degradation of the steering feeling.

3 Claims, 2 Drawing Sheets

U.S. PATENT DOCUMENTS

2007/0006674 A1 * 1/2007 Kuroumaru et al. ...... 74/388 PS

FOREIGN PATENT DOCUMENTS

| JP | 2000-43739 A | 2/2000 |
| JP | 2001-355700-1 | 12/2001 |
| JP | 2003-034254 A | 2/2003 |
| JP | 2003034255 A * | 2/2003 |
| JP | 2003-63424 A | 3/2003 |
| JP | 2003-214529 A | 7/2003 |
| JP | 2005112124 A * | 4/2005 |

* cited by examiner

ELECTRIC MOTOR POWER STEERING SYSTEM

TECHNICAL FIELD

The present invention relates to an electric power steering system which is mounted in vehicles such as automotive vehicles and which uses an electric motor for assisting a driver in steering operation.

BACKGROUND ART

The electric power steering system, such as mounted in the automotive vehicle, includes the electric motor coupled with a steering mechanism extending from a steering member to dirigible wheels and is designed to apply a power of the motor to the steering mechanism via a reduction mechanism thereby assisting the driver at operating the steering member. In such a steering system, rattle produced at meshing engagement portion between teeth portions included in the reduction mechanism may be transmitted to the driver as rattle noises (rattling noises) so as to cause discomfort to the driver. It is therefore desired to reduce the rattling noises.

Some conventional systems, such as disclosed in Japanese Unexamined Patent Publication No.2000-43739, are arranged as follows to meet this demand. In the reduction mechanism, a worm shaft coupled with an output shaft of the electric motor is urged toward a worm wheel mounted to the steering mechanism thereby accommodating backlash at the meshing engagement portion between the worm wheel and the worm shaft and suppressing the rattling noises.

Other conventional systems, such as disclosed in Japanese Unexamined Patent Publication No.2003-63424, use a lubricant as follows for reducing the rattling noises. That is, a permanent magnet is disposed in the vicinity of the meshing engagement portion, whereas the lubricant composed of a magnetic fluid magnetically attracted by the magnet is allowed to reside at the meshing engagement portion at all times such that the rattling noises may be reduced by way of the lubricant.

However, the aforementioned conventional systems do not pay adequate consideration to a vibration system including the reduction mechanism and the electric motor. Hence, the systems may sometimes encounter rattling noises caused by intrinsic vibrations in the vibration system or may suffer degraded steering feeling due to the intrinsic vibrations. Specifically, the electric motor as an inertial component is coupled with the steering mechanism via the meshing engagement portion between the teeth portions, as an elastic component, in the reduction mechanism, so that the aforesaid vibration system is constituted which has its reference end defined by the steering mechanism and its free end defined by the electric motor. When disturbance from the dirigible wheels is inversely inputted to the system, for example, the vibration system is prone to vibrations (resonance) particularly when the steering is in a dead zone where the electric motor is not driven. This may result in increased rattling noises or a significant degradation of the steering feeling.

In view of the aforementioned problem of the prior art, it is an object of the invention to provide an electric power steering system which is adapted to prevent the occurrence of the rattling noises attributable to the vibration system including the reduction mechanism and electric motor and to suppress the degradation of the steering feeling.

DISCLOSURE OF THE INVENTION

The invention for achieving the above object provides an electric power steering system for providing steering assist by applying a power of an electric motor to a steering mechanism via a reduction mechanism, the steering mechanism extending from a steering member to dirigible wheels, wherein a viscous material is provided on a transmission path of the power of the motor, which extends from the electric motor to the steering mechanism via the reduction mechanism, the viscous material having a viscosity constant C satisfying the following inequality (1):

$$0.8\, J\omega p \leq C \quad (1)$$

where J denotes the inertia of the electric motor, and $\omega p$ denotes the resonant angular frequency of the steering mechanism including the electric motor and the reduction mechanism.

In the electric power steering system arranged as described above, the present inventors have found that the viscous material having the viscosity constant C satisfying the inequality (1) may be provided on the motor-power transmission path, thereby allowing the viscous material to impart a proper viscosity to the power transmission path. Thus, the inventors have found that the intrinsic vibrations in the vibration system including the electric motor as the inertial component and the meshing engagement portion between the teeth portions as the elastic component disposed in the reduction mechanism are easily suppressed by way of the viscosity of the viscous material.

In the above electric power steering system, the viscous material may preferably have its viscosity constant C defined to satisfy the following inequality (2):

$$0.8\, J\omega p \leq C \leq 4\, J\omega p \quad (2).$$

In this case, the viscosity imparted from the viscous material to the power transmission path is limited by the right-hand side of the inequality (2), such as to ensure an adequate response of the motor power transmitted to the steering mechanism when the electric motor is driven to provide the steering assist. Hence, the degradation of the steering feeling associated with the inadequate response may also be obviated.

In the above electric power steering system, the viscous material may be grease applied to the meshing engagement portion between the teeth portions included in the reduction mechanism.

In this case, the grease as the viscous material is allowed to reside on the motor-power transmission path at all times regardless of the ON/OFF state of the electric motor, so that the vibrations in the above vibration system such as produced at the time of ON/OFF switching of the motor may be more assuredly suppressed. This leads to a more effective prevention of the occurrence of the rattling noises and the degradation of the steering feeling.

BEST MODES FOR CARRYING OUT THE INVENTION

A preferred embodiment of an electric power steering system according to the invention will hereinbelow be described with reference to the accompanying drawings.

Figure 1:
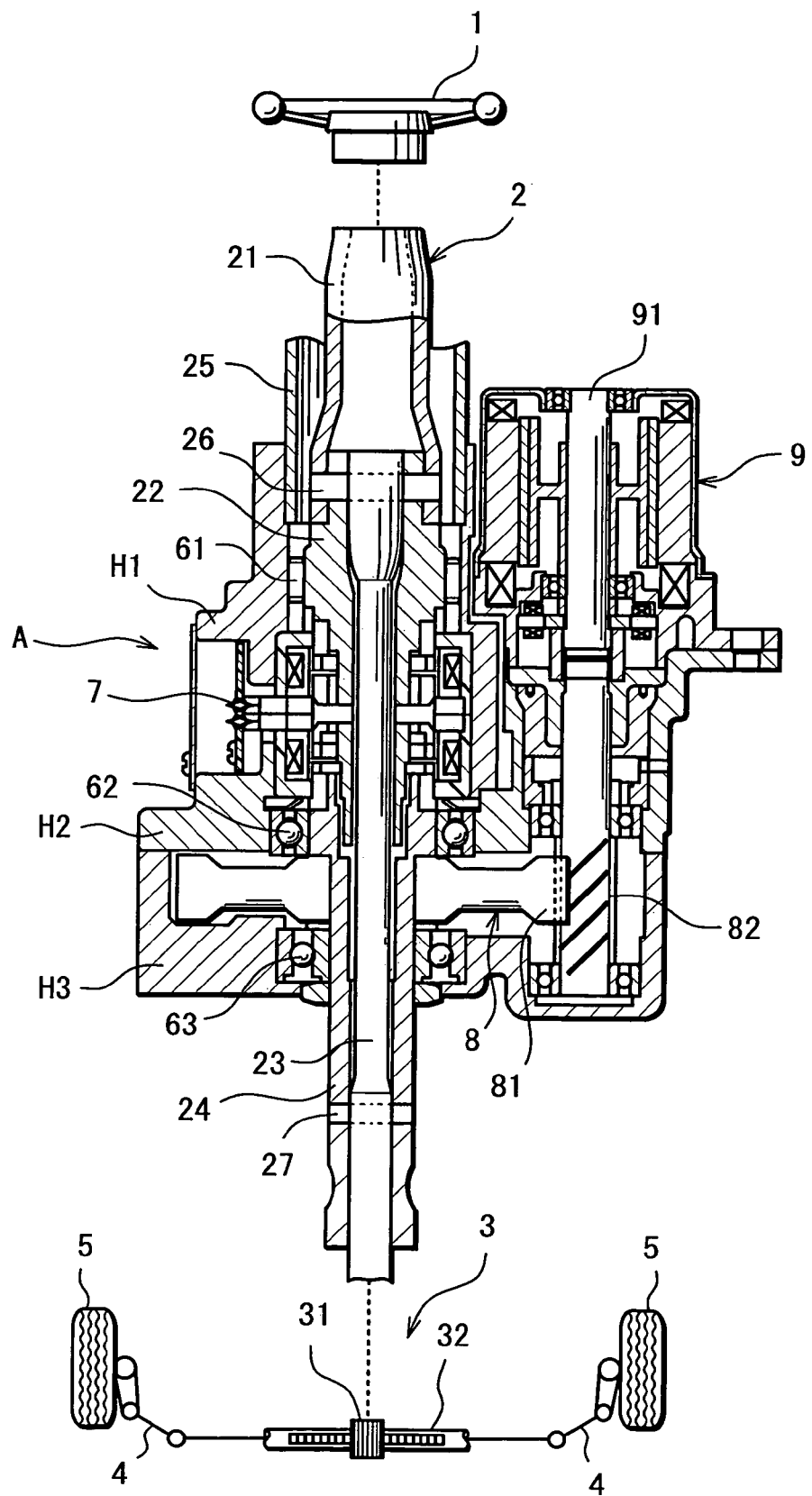
FIG. 1 is a schematic diagram showing an arrangement of a principal part of an electric power steering system according to one embodiment of the invention.

FIG. 1 is a schematic diagram showing an arrangement of a principal part of an electric power steering system according to one embodiment of the invention. Referring to the figure, the system is mounted in an automotive vehicle, for example, and includes a steering shaft 2 adapted to change the direction of dirigible wheels 5 according to a steering operation of a driver operating a steering member (steering wheel) 1. The steering shaft 2 includes: a cylindrical mounting shaft 21 mounted with the steering member 1 at an upper end thereof; a cylindrical input shaft 22 unitarily rotatably coupled with the mounting shaft 21; and a cylindrical output shaft 24 coaxially coupled with the input shaft 22 via a torsion bar 23. A pinion shaft 31 and a rack shaft 32 of a rack and pinion type transmission mechanism 3 are coupled, in this order, to a lower end of the output shaft 24 via unillustrated universal joints. Furthermore, the aforesaid dirigible wheels 5 on lateral sides are coupled to corresponding lateral ends of the rack shaft 32 via tie rods 4. The rotation of the steering shaft 2 is converted into lateral linear motions by means of the rack and pinion type transmission mechanism 3 whereby the dirigible wheels 5 are steered.

The aforesaid mounting shaft 21 is fixed to a vehicle body as accommodated in a steering column 25. A lower end of the mounting shaft 21 is coupled with an upper end of the input shaft 22 by means of a pin 26, the input shaft 22 in which one end of the torsion bar 23 is fixedly fitted. The other end of the torsion bar 23 is fitted in and fixed to a lower end of the output shaft 24 by means of a pin 27.

The input shaft 22 and the output shaft 24 are rotatably mounted in a first housing H1 and second and third housings H2, H3 via a needle roller bearing 61 and ball bearings 62, 63, the first, second and third housings are fixed to the vehicle body and designed to be separable in a vertical direction as seen in the figure.

The output shaft 24 is coupled to a reduction mechanism 8 including a reduction gear 81 and a pinion shaft 82 meshed therewith, and to an electric motor 9 for steering assist, an output shaft 91 of which is unitarily rotatably mounted with the pinion shaft 82 and which is driven according to a detection result supplied from a torque sensor 7. These reduction mechanism 8 and electric motor 9 constitute a steering assist portion for applying a steering assist force based on motor power to a steering mechanism A extending from the steering member 1 to the dirigible wheels 5. As will be described in details hereinlater, vibrations in a vibration system including the above reduction mechanism 8 and electric motor 9 are suppressed by means of a viscous material provided on a motor-power transmission path in the steering assist portion.

Figure 2:
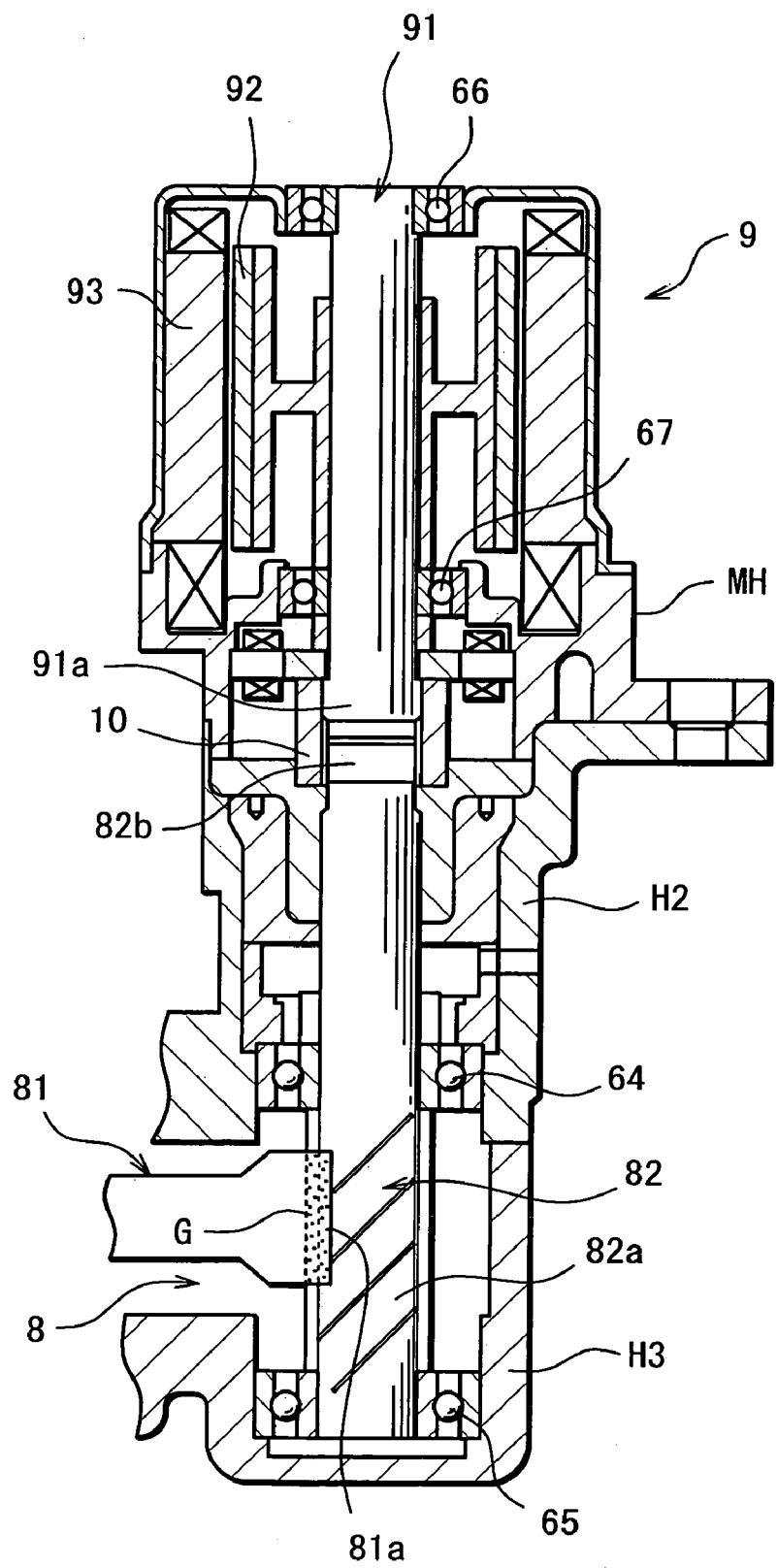
FIG. 2 is an enlarged sectional view showing a specific example of an arrangement of a reduction mechanism and an electric motor shown in FIG. 1.

Going into details with further reference to FIG. 2, the reduction gear 81 is composed of, for example, an involute helical gear, which is formed with a teeth portion 81a in its outside periphery and which is integrally mounted to the output shaft 24. On the other hand, the pinion shaft 82 is formed with a teeth portion 82a in its outside periphery, the teeth portion 82a in meshing relation with the teeth portion 81a. The pinion shaft 82 is supported in the third housing H3 as rotatably carried on ball bearings 64, 65.

The aforesaid electric motor 9 includes a motor rotor 92 integrally mounted to the output shaft 91 thereof, and a motor stator 93 disposed in opposing relation with the rotor 92. The output shaft 91 is supported in a motor housing MH as rotatably carried on ball bearings 66, 67, the motor housing designed to be free to be mounted to or dismounted from the second housing H2. The output shaft 91 has one end 91a thereof press inserted in a cylindrical joint member 10. The joint member 10 is coupled with an end 82b of the pinion shaft 82 via serration engagement, such that the pinion shaft 82 is unitarily rotatably connected with the output shaft 91.

In the reduction mechanism 8, the reduction gear 81 and the pinion shaft 82 are interconnected in a manner to allow for some degree of backlash at a meshing engagement portion therebetween. The arrangement is made such that the motor power may be transmitted to the steering shaft 2 by means of the reduction mechanism 8 increased in gear efficiency.

Furthermore, the meshing engagement portion between the teeth portions 81a, 82a in the above reduction mechanism 8 is applied with a grease G indicated by small dots in FIG. 2. The grease G works as the aforesaid viscous material for suppressing the intrinsic vibrations in the vibration system, which has its reference end defined by the steering mechanism A and its free end defined by the electric motor 9. In other words, the grease works as the viscous material for suppressing the intrinsic vibrations in the vibration system including the reduction mechanism 8 and the electric motor 9. The viscous material is adjusted for the hardness and application amount, thereby having a viscosity constant C satisfying the following inequality (1) or preferably the following inequality (2):

$$0.8 \, J\omega p \leq C \tag{1};$$

$$0.8 \, J\omega p \leq C \leq 4 \, J\omega p \tag{2}.$$

In the above inequalities (1) and (2), J denotes the inertia of the electric motor 9; ωp denotes the resonant angular frequency of the steering mechanism A including the reduction mechanism 8 and the electric motor 9. The use of the grease G having such a viscosity constant C permits the transmission path of the power of the motor 9 to be imparted with a suitable value of viscosity, the transmission path extending from the electric motor 9 to the steering shaft 2 of the steering mechanism A via the reduction mechanism 8. Thus, the occurrence of the rattling noises at the meshing engagement portion between the teeth portion 81a and the teeth portion 82a and the degradation of the steering feeling may be prevented. In addition, an upper limit of the viscosity constant C is defined by a value of the right-hand side of the inequality (2), whereby the viscosity of the grease G acting on the power transmission path as resistance against the motor power transmitted to the steering shaft 2 is limited so as to prevent the motor power response from being decreased when the electric motor 9 is driven for providing the steering assist.

More specifically, the above vibration system as seen from the steering shaft 2 (steering mechanism A) is represented by a transfer function $1/(Js^2+Cs+K)$ of a secondary vibration system, the function expressed using the inertia J of the electric motor 9, the viscosity constant C of the grease G, the elastic constant K at the engagement portion between the teeth portions 81a, 82a and the Laplace operator s. The transfer function can be expanded to the following equations (3) and (4). Therefore, the intrinsic angular frequency ωn and the damping coefficient ζ of the above vibration system are represented by the following equations (5) and (6), respectively, on condition that the detonators of the equations (3) and (4) are of the same value. In addition, the above resonant angular frequency ωp can be transformed to an equation (7) using the intrinsic angular frequency ωn and the damping coefficient ζ, and the equation (7) can be further expanded to an equation (8).

$$1/(Js^2 + Cs + K) = (1/J)/(s^2 + Cs/J + K/J) \quad (3)$$

$$= (1/J)/(s^2 + 2\zeta\omega n s + \omega n^2) \quad (4)$$

$$\omega n = (K/J)^{1/2} \quad (5)$$

$$\zeta = C/2J\omega n = C/2(KJ)^{1/2} \quad (6)$$

$$\omega p = \omega n(1 - 2\zeta^2)^{1/2} \quad (7)$$

$$= \omega n(1 - C^2/2KJ)^{1/2} = (K/J - C^2/2J^2)^{1/2} \quad (8)$$

It is noted here that the above damping coefficient ζ has its proper value range defined by the following inequality (9) as will be described in details hereinlater. Next, the following equation (10) can be obtained by substituting the above equation (6) in the inequality (9) and rewriting the inequality accordingly. The equation (10) defines the viscosity constant C using the above motor inertia J and elastic constant K. The grease G having the viscosity constant C defined by the left-hand side of the inequality (10) may be applied to the engagement portion between the teeth portions 81*a*, 82*a*, whereby the intrinsic vibrations in the vibration system including the reduction mechanism 8 and the electric motor 9 may be easily suppressed. Furthermore, the decrease of the motor power response may be prevented by defining the viscosity constant C of the grease G with the right-hand side of the inequality (10).

$$0.4 \leq \zeta \leq 2 \quad (9)$$

$$0.64\, KJ \leq C^2 \leq 16\, KJ \quad (10)$$

It is difficult to determine the elastic constant K at the above meshing engagement portion between the teeth portions in an actual system. The following description is made on a procedure for obtaining the above inequalities (1) and (2) defining the viscosity constant C by way of the motor inertia J and resonant angular frequency ωp which are relatively easily-obtainable measurement data on the actual system.

Where the damping coefficient ζ in the above equation (7) is of a sufficiently small value, an expression ωp≈ωn holds, so that the above equation (6) can be transformed to the following expression (11)

$$\zeta \approx C/2\, J\omega p \quad (11).$$

The viscosity constant C is solved by substituting the damping coefficient ζ of the expression (11) for the proper value range indicated by the above inequality (9), whereby the above inequalities (1) and (2) can be obtained.

The damping coefficient ζ defined by the above inequality (9) may take a value of 0.4 or more, whereby the grease G can impart its viscosity as the minimum required load (resistance) on the engagement portion between the teeth portions 81*a*, 82*a* (on the power transmission path). Thus, the grease G may apply such a resistance to the power transmission path as to decrease the vibrations at the meshing engagement portion to a degree that the driver may not perceive the rattling noises caused by the vibrations at the meshing engagement portion or the change of the steering feeling.

In theory, a requirement for preventing the secondary vibration system from encountering overshoot against normal step response is that the damping coefficient ζ has a value of $2^{-1/2}$ or more. Specifically, the viscosity constant C may preferably be defined by the above expression (11) to be (2 Jωp/$2^{1/2}$) or more (otherwise, defined by the above equation (6) to be $(2(KJ)^{1/2}/2^{1/2})$ or more), whereby the above vibration system may be a relatively stable system, an intrinsic frequency curve of which includes no peak gain. It is further preferred to define the damping coefficient ζ to be 1 or more, or to define the viscosity constant C to be 2 Jωp (or 2 $(KJ)^{1/2}$) or more because the vibrations (resonance) in the above vibration system may be obviated.

The viscosity applied by the grease G to the power transmission path is limited by selecting a damping coefficient ζ of 2 or less, such that heavy resistance in the steering operation may not be suddenly decreased when, for example, the electric motor 9 is shifted from a non-assist mode where the motor is not activated to an assist mode. Thus is prevented a significant degradation of the steering feeling.

In a case where a damping coefficient ζ of less than 0.4 is selected, the grease G applies an insufficient viscosity to the power transmission path so that the above vibration system is not stabilized. Hence, the rattling noises caused by the vibrations in the vibration system are more likely to increase or the steering feeling is more likely to degrade.

In a case where a damping coefficient ζ of more than 2 is selected, the grease G applies an excessive viscosity. When the electric motor 9 is shifted to the assist mode, for example, the transmission of the motor power to the steering shaft 2 is delayed and hence, the steering feeling may relatively be degraded.

Numerical examples of the above viscosity constant C are given here. Provided that a design value of the inertia J of the electric motor 9 is on the order of $J=0.67\times10^{-4}$ (kg·m$^2$) as determined about the output shaft 91*a* thereof and that a reduction ratio of the reduction mechanism 8 is 9.7, a motor inertia J as determined about the steering shaft 2 is $J=0.67\times 10^{-4}\times 9.7^2$ (kg·m$^2$)=$0.63\times 10^{-2}$ (Nm·s$^2$/rad). The resonant frequency fp as measured about the steering shaft 2 is on the order of 22 to 25 (Hz), which is converted to a resonant angular frequency ωp on the order of 138 to 157 (rad/s).

Substituting the specific values of the inertia J and the resonant angular frequency ωp in the above inequality (2) gives a specific range of the preferred viscosity constant C as $0.70 \leq C \leq 3.96$.

In the electric power steering system of the embodiment having the aforementioned arrangement, the grease G (viscous material) having the viscosity constant C defined by the above inequality (1) (or the left-hand side of the inequality (10)) is applied to the meshing engagement portion in the reduction mechanism 8 so as to impart a proper viscosity to the motor power transmission path extending from the electric motor 9 to the steering shaft 2. Thus, the electric power steering system is adapted for easy suppression of the intrinsic vibrations in the vibration system including the reduction mechanism 8 and the electric motor 9. Therefore, the occurrence of the rattling noises caused by the vibrations in the vibration system and the degradation of the steering feeling may be prevented.

The viscosity constant C is defined by the value of the right-hand side of the inequality (2) (or the value of the right-hand side of the inequality (10)), whereby the viscosity of the grease G acting as the resistance on the power transmission path may be limited. This ensures the adequate response of the motor power (the speed at which the power is transmitted to the steering shaft 2) when the steering assist is provided. In addition, the degradation of the steering feeling associated with the inadequate response may be obviated.

According to the embodiment, the grease G applied to the meshing engagement portion between the teeth portion 81*a* of the reduction gear 81 and the teeth portion 82*a* of the pinion shaft 82 is used for imparting the proper viscosity to the motor power transmission path thereby suppressing the vibrations in the above vibration system. Therefore, the above vibrations can be suppressed regardless of the operation mode of the electric motor 9. As a result, the vibrations in the above vibration system may be more assuredly suppressed even when the steering is in the dead zone where the electric motor 9 is not driven and when the motor 9 is switched between the ON and OFF states. This leads to a more effective prevention of the occurrence of the rattling noises and the degradation of the steering feeling. In addition, unlike the conventional examples as disclosed in Japanese Unexamined Patent Publication No.2003-63424, the electric power steering system featuring silent operations and an excellent steering feeling may be easily implemented in a simple constitution without using a lubricant (magnetic fluid) of the special composition or providing the permanent magnet.

While the foregoing description illustrates the case where the viscosity constant C of the grease G applied to the meshing engagement portion between the teeth portion 81*a* of the reduction gear 81 and the teeth portion 82*a* of the pinion shaft 82 is defined, the invention is not limited to this and may include any arrangement wherein the viscous material having the viscosity constant C satisfying the aforesaid inequality (1) is applied to the aforesaid motor power transmission path. Specifically, an arrangement may be made, for example, such that preload is applied to bearings for supporting the motor output shaft 91 and the pinion shaft 82, thereby permitting these bearings to function as the viscous material.

While the foregoing description illustrates the case where the invention is applied to the reduction mechanism 8 including the reduction gear 81 composed of the helical gear integrally mounted to the output shaft 24 and the pinion shaft 82 rotatable in unison with the motor output shaft 91, the invention is also applicable to a system including a reduction mechanism including gears of different types than the above, such as a worm wheel and a worm meshed therewith. While the foregoing description illustrates the case where the invention is applied to the electric power steering system of column-assist type wherein the electric motor 9 is coupled with the steering shaft 2, the invention is also applicable to systems of other assist types, such as a rack assist type wherein a steering assist motor is coupled with a rack shaft for assisting the movement of the rack shaft.

What is claimed is:

1. An electric power steering system for providing steering assist by applying a power of an electric motor to a steering mechanism via a reduction mechanism, the steering mechanism extending from a steering member to dirigible wheels, wherein a viscous material is provided on a transmission path of the motor power, which extends from the electric motor to the steering mechanism via the reduction mechanism, the viscous material having a viscosity constant C satisfying the following inequality (1):

$$0.8J\omega p \leq C \qquad (1)$$

where J denotes the inertia of the electric motor, and $\omega p$ denotes the resonant angular frequency of the steering mechanism including the electric motor and the reduction mechanism.

2. An electric power steering system according to claim 1, wherein the viscous material has its viscosity constant C defined to satisfy the following inequality (2):

$$0.8J\omega p \leq C \leq 4J\omega p \qquad (2).$$

3. An electric power steering system according to claim 1 or 2, wherein the viscous material is grease applied to a meshing engagement portion between teeth portions included in the reduction mechanism.

* * * * *